(12) United States Patent
von Freyhold et al.

(10) Patent No.: US 7,110,183 B2
(45) Date of Patent: Sep. 19, 2006

(54) DEVICE FOR THE OPTICAL BEAM TRANSFORMATION OF A LINEAR ARRANGEMENT OF SEVERAL LIGHT SOURCES

(75) Inventors: Thilo von Freyhold, Glückstadt (DE); Jörg Hünkemeier, Jena (DE)

(73) Assignee: unique-m.o.d.e. AG, Jena (DE)

( * ) Notice: Subject to any disclaimer, the term of this patent is extended or adjusted under 35 U.S.C. 154(b) by 49 days.

(21) Appl. No.: 11/034,789

(22) Filed: Jan. 13, 2005

(65) Prior Publication Data
US 2005/0232628 A1 Oct. 20, 2005

(30) Foreign Application Priority Data
Jan. 15, 2004 (DE) .................. 10 2004 002 221

(51) Int. Cl.
*G02B 27/10* (2006.01)
(52) U.S. Cl. .................. 359/619; 359/623; 359/625
(58) Field of Classification Search ............... 359/619, 359/620, 621, 623, 625, 629, 639
See application file for complete search history.

(56) References Cited
U.S. PATENT DOCUMENTS
5,168,401 A 12/1992 Endriz

| | | |
|---|---|---|
| 5,270,280 A | 12/1993 | Ichikawa et al. |
| 5,513,201 A | 4/1996 | Yamaguchi et al. |
| 5,517,359 A | 5/1996 | Gelbart |
| 6,680,800 B1 | 1/2004 | Schreiber et al. |

FOREIGN PATENT DOCUMENTS

| | | |
|---|---|---|
| DE | 196 45 150 A1 | 5/1998 |
| DE | 198 20 154 A1 | 9/1999 |
| DE | 199 48 889 C1 | 6/2001 |
| EP | 0 484 276 A1 | 5/1992 |
| EP | 0 484 176 B1 | 6/1994 |
| WO | WO 95/15510 A2 | 6/1995 |
| WO | WO 01/27686 A1 | 4/2001 |

*Primary Examiner*—Ricky Mack
*Assistant Examiner*—Brandi N. Thomas
(74) *Attorney, Agent, or Firm*—Leydig, Voit & Mayer, Ltd.

(57) ABSTRACT

The present invention pertains to an optical symmetrization device for symmetrizing the radiation emitted by laser diodes. The symmetrization device contains a cylindrical lens system (3), a cylindrical lens array (4) and a deflection element (5). The cylindrical lens array (4) contains at least two cylindrical single lenses (4A) that are arranged adjacent to one another in fixed allocation, wherein the distance between two adjacent single lenses (4A) is smaller than the distance between two adjacent linear optical emitters (2).

24 Claims, 4 Drawing Sheets

Fig. 2A
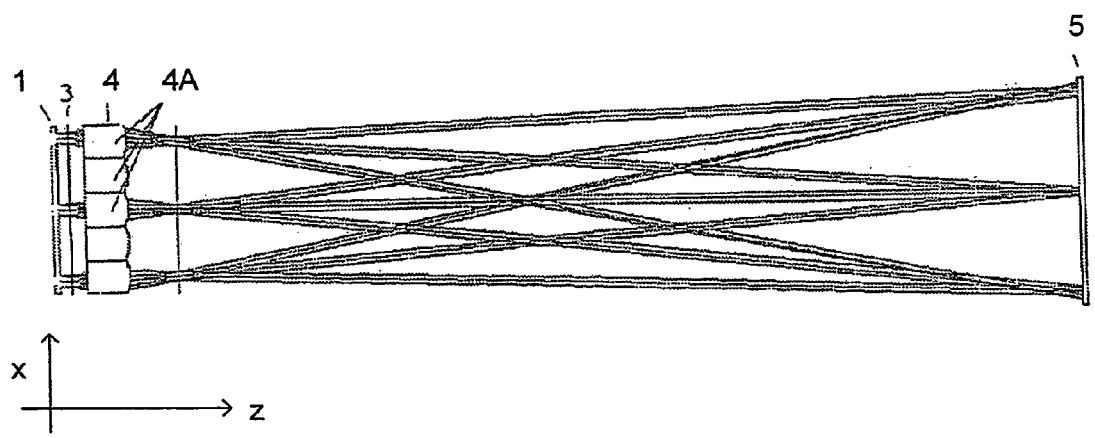
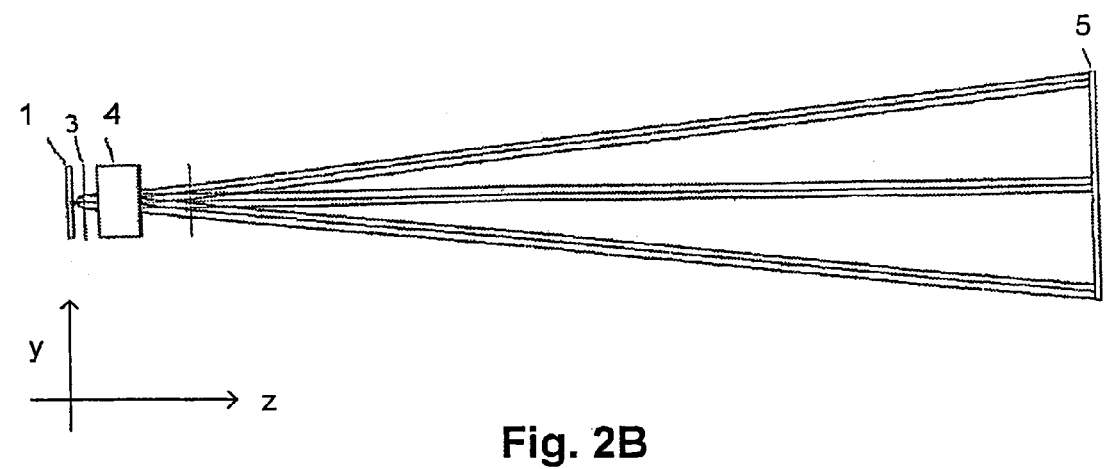
Fig. 2B

DEVICE FOR THE OPTICAL BEAM TRANSFORMATION OF A LINEAR ARRANGEMENT OF SEVERAL LIGHT SOURCES

CROSS-REFERENCE TO RELATED APPLICATIONS

This application claims priority to German patent application number 10 2004 002 221.6, filed Jan. 15, 2004 which is hereby incorporated by reference.

The present invention pertains to an optical symmetrization device for symmetrizing the radiation emitted by laser diodes. In the manufacture of high-power laser diode arrangements, several laser diodes are arranged adjacent to one another in fixed allocation such that a so-called laser diode array is formed. Such laser diode arrays with an optical output power, for example, up to 40 W usually consist of several laser diodes in the form of individual emitters that are arranged in a row, wherein the geometric dimensions of the respective emitting surfaces lie between approximately 50×1 µm and approximately 200×1 µm, and wherein these emitters are always linearly arranged in the direction of their greatest dimension. The output radiation of these laser diode arrays is extremely asymmetric. A symmetric beam cluster of high radiation density is required in most practical applications for such laser diode arrays, e.g., for pumping solid-state lasers, for material processing and medical purposes. This means that the most compact optical systems possible for symmetrizing the beam are required for the broad utilization of high-power laser diodes in the above-mentioned fields.

FIELD OF THE INVENTION

Devices and arrangements for modifying the radiation emitted by high-power laser diodes are already known from the state of the art.

BACKGROUND OF THE INVENTION

The first group of methods utilizes special beam rotating elements, for example, in the form of prisms in order to spatially turn the beam clusters emitted by the individual emitters by an angle of typically 90° (U.S. Pat. No. 5,168,401 A; EP 0 484 276 A1; U.S. Pat. No. 5,513,201 A). In a second group of arrangements, the output radiation of the laser diodes passes through a system consisting of two highly reflective surfaces that are slightly inclined relative to one another, such that a suitable reconfiguration of the laser diode cluster is achieved at the output of this system (WO 95/15510). The disadvantage of these two groups of arrangements is, in particular, the complexity of the micro-optical elements used, wherein this applies, in particular, to the beam rotation that appears to make it extremely difficult to combine larger numbers of emitters into a laser diode array, as well as the high adjusting expenditure of the entire system and the inability to manufacture systems of this type inexpensively.

Less complicated optical beam transformation systems are disclosed in DE 198 20 154 A1 and DE 196 45 150 A1. DE 198 20 154 A1 describes a device for the optical beam transformation of a beam cluster with an extensive beam cross section, wherein said device comprises optical elements with optically active boundary surfaces that are arranged in the beam path. The deflection of the beam clusters is achieved with a Fourier lens that, as a collimator system simultaneously minimizes the divergence of the whole beam. A downstream deflection element is situated in the rear focal plane of the Fourier lens. In the arrangement according to DE 198 20 154 A1, the radiation emitters need to be arranged in the front focal plane of the Fourier lens and the second angular transformation element needs to be arranged in the rear focal plane of the Fourier lens. This disadvantageously results in a significant overall length of the arrangement due to the distance between the emitters and the deflection element that amounts to at least twice the focal length of the Fourier lens. In addition, the Fourier lens needs to have a large aperture and adequate focusing characteristics, i.e., a long focal length, because the beam clusters of the emitters have a significant divergence upstream of the Fourier lens and extend parallel to the optical axis. Another disadvantage can be seen in the fact that the beam characteristics and the deflection angles of the beam clusters cannot be adjusted independently of one another.

SUMMARY OF THE INVENTION

DE 196 45 150 A1 also pertains to an optical device or arrangement for symmetrizing the radiation emitted by laser diodes. Instead of utilizing a cylindrical lens array as is the case with the present invention, DE 196 45 150 A1 employs a directional element in the form of a field lens with a focal length that corresponds to the distance between the field lens and a redirecting element. The disadvantages of the arrangement described in this patent can be seen in that the beam characteristics of the beam clusters emitted by the laser diodes cannot be influenced with the directional element, and in that the distance between the field lens and the redirecting element needs to be chosen relatively long if a field lens is used as the directional element, namely because the field lens needs to have a large aperture and adequate focusing characteristics due to the large size of the laser diode array. This requires a long focal length. According to DE 196 45 150 A1, the redirecting element is arranged in the rear focal plane of the field lens. DE 196 45 150 A1 also does not make it possible to adjust the beam characteristics and the deflection angle of the beam clusters independently of one another. In addition, the arrangement proposed in this patent has a comparatively long overall length.

U.S. Pat. No. 5,517,359 A should also be mentioned with respect to the state of the art. However, the optical beam shaping system described in this patent does not serve for symmetrizing the radiation emitted by a laser diode array, but rather for generating a homogenous illumination for a light valve array. A cylindrical lens array used in the optical beam shaping system described in this patent primarily serves for deflecting the beam clusters of the laser diode array, wherein the principal beams of the beam clusters should coincide on the optical axis a certain distance from the cylindrical lens array. A cylindrical lens system arranged in front of the cylindrical lens array is not tilted or turned relative to the optical axis. This means that the beam characteristics are also transformed by the cylindrical lens array. However, the optical beam shaping system disclosed in U.S. Pat. No. 5,517,359 A does not separate the beam clusters in a plane and therefore it is impossible to achieve an independent directional manipulation of individual beam clusters in order to symmetrize the beam. An additional deflection element consequently cannot and should not be utilized in U.S. Pat. No. 5,517,359 A.

The invention is based on the objective of making available an optical device or arrangement for symmetrizing the radiation emitted by a plurality of laser diodes that are arranged adjacent to one another in fixed allocation, wherein said device or arrangement transforms the output radiation with comparatively simple micro-optical components and with an improved optical efficiency without loss in radiation density, and wherein said device or arrangement makes it possible to adjust the beam characteristics and the deflection angles of the beam clusters independently of one another. In comparison with the state of the art, the device or arrangement according to the invention also has a shorter overall length or smaller dimensions.

This object preferably is achieved by the characterizing features of the present invention. Advantageous embodiments and further developments of the solution will be apparent from the description of the invention provided herein.

An optical symmetrization device according to the invention for symmetrizing the radiation emitted by a one-dimensional laser diode array comprises the following components: a cylindrical lens system is arranged in the beam path of the laser diode array downstream of the laser diode array. A cylindrical lens array is arranged in the beam path downstream of the cylindrical lens system, and a deflection element is arranged in the beam path downstream of the cylindrical lens array. In one advantageous embodiment of the symmetrization device according to the invention, a focusing system is provided in addition to the above-described elements. As mentioned above, the symmetrization device or the optical arrangement serves for symmetrizing the radiation emitted by a one-dimensional laser diode array. In this case, a laser diode array with asymmetric beam characteristics and asymmetric beam quality is transformed into a virtual emitter with symmetric beam characteristics. The design of the laser diode array is preferably characterized in that the individual emitters of the array are arranged adjacent to one another in a first direction α-direction/x-axis) that extends perpendicular to the optical emitting direction of the emitters or the optical axis such that they are spaced apart by a defined distance that preferably is identical for all emitters (wherein the optical axis is referred to as the z-direction/z-axis and the aforementioned first direction is referred to as the x-direction/x-axis below), in that the principal beams of the beam clusters of the individual emitters extend in the z-direction, and in that an intermediate space exists between two respective emitters. The offset between one emitter and an adjacent emitter in the x-direction is also referred to as the pitch. An emitter can be described in the form of a light source that only extends in the x-direction and the radiation of which typically has a higher divergence in the direction extending perpendicular to the x-direction and the z-direction (also referred to as the y-direction below). The beam quality of the laser diode array is lower in the direction of the emitter arrangement α-direction) than in the direction extending perpendicular thereto (y-direction). Since a cylindrical lens system is arranged in a suitable orientation relative to the laser diode array in a sufficiently isoplanasic fashion, i.e., tilted about the z-axis or the optical axis, the output clusters of the individual emitters of the laser diode array are respectively emitted at different angles and thus separated in the direction perpendicular to the direction of the linear arrangement of the individual emitters and the optical axis at a sufficiently long distance downstream of the lens. Instead of achieving this deflection by turning the cylindrical lens about the z-axis, it would also be conceivable to arrange an optional separate deflection element downstream of the cylindrical lens. The beam clusters of the emitters that are arranged in the x-direction in the x-z plane consequently are collimated in the y-z plane that lies perpendicular to the x-axis by the cylindrical lens system that is slightly turned, if so required, about the z-axis. These beam clusters may be deflected in the y-direction with different deflection angles in such a way that they are completely separated from one another in the y-z plane at the location of the deflection element. The single lenses of the cylindrical lens array arranged downstream of the cylindrical lens system are arranged adjacent to one another such that they are spaced apart in the x-direction by a defined distance that is identical for all single lenses. In this case, the pitch of the cylindrical lens array is slightly smaller than the pitch of the laser diode array. One single lens of the cylindrical lens array is assigned to each emitter of the laser diode array in such a way that the offset between the emitter and the single lens in the x-direction is minimal for the emitter that lies on the optical axis, e.g., equal to 0, and maximal for the two emitters that are situated farthest from the optical axis. This means that the offset becomes greater in the x-direction as the distance of the single lenses from the optical axis increases. The cylindrical lens array transforms the beam characteristics of the beam clusters of the emitters in the x-z plane and deflects the beam clusters in the x-z plane in such a way that their principal beams coincide at the location of the deflection element. The beam characteristics and the progression of the beam clusters are adapted by choosing a suitable common focal length of the single lenses, a suitable focal length of the cylindrical lens system as well as a suitable turning angle of the cylindrical lens system about the optical axis, such that the whole beam cluster has the same size in the x-z plane and in the y-z plane and the divergence of the individual beam clusters in the x-z plane corresponds to the divergence of the whole beam cluster in the y-z plane. It is also ensured that the virtual emitter formed by the optical arrangement has symmetric beam characteristics in the x-z plane and in the y-z plane. After defining the focal length of the single lenses, the required deflecting angles of the beam clusters in the x-z plane are realized by choosing a suitable pitch for the cylindrical lens array. The distance between the cylindrical lens array and the deflection element consequently can be freely chosen within a broad range. This results in an additional degree of freedom with respect to the dimensions of the deflection element. The deflection element arranged downstream of the cylindrical lens array now deflects each beam cluster in the x-z plane, such that the deflection caused by the cylindrical lens array is respectively compensated again. The principal beams of the beam clusters consequently coincide with the optical axis in the x-z plane downstream of the deflection element. Downstream of the deflection element, the whole beam cluster has the same divergence and size in the x-z plane and in the y-z plane, as well as the same size of the virtual beam cluster waist. The whole beam cluster may be coupled, for example, into a glass fiber with adapted core diameter and acceptance angle by the focusing system that is arranged in the beam path downstream of the deflection element in one preferred embodiment of the device according to the invention.

The previously described optical symmetrization device, in particular, provides the following advantages in comparison with the state of the art:

The beam characteristics and the deflection angles of the beam clusters in the x-z plane can be adjusted independently of one another by utilizing the cylindrical lens array in the above-described fashion. This is not possible when utilizing a field lens or when utilizing a Fourier lens.

An optical arrangement with more favorable dimensions than those known from the state of the art can be realized due to the utilization of a cylindrical lens array in the above-described fashion. An additional degree of freedom with respect to the design is achieved at given emitter characteristics and a given emitter arrangement in the x-direction by realizing a symmetric virtual emitter that can be easily arranged in a symmetric spot, such that comparably superior focusing properties are achieved. This additional degree of freedom makes it possible to freely choose the location and size of the redirecting element within a broad range to minimize the apertures of the downstream collimator and/or focusing system to achieve a shorter overall length of the optical arrangement than that known from the state of the art by utilizing an intermediately arranged collimator and/or focusing system.

In simpler arrangements that merely focus the array without beam shaping, the function of a slow-axis collimator array that improves the filling factor, i.e., the beam parameter product, and the function of a field lens can be combined in one element in the above-described fashion with a cylindrical lens array. This makes it possible to realize these two functions more easily, less expensively and with lower losses.

BRIEF DESCRIPTION OF THE DRAWINGS

The optical symmetrization device according to the invention may be realized or utilized as described in one of the following examples. Identical or corresponding parts or components are identified by the same reference symbols in all figures.

Shown are:

FIG. 2, the same progression, wherein each output beam cluster is composed, however, of the beam clusters of three field points of an emitter;

DETAILED DESCRIPTION OF THE EMBODIMENTS

Figures 1A, 1B:
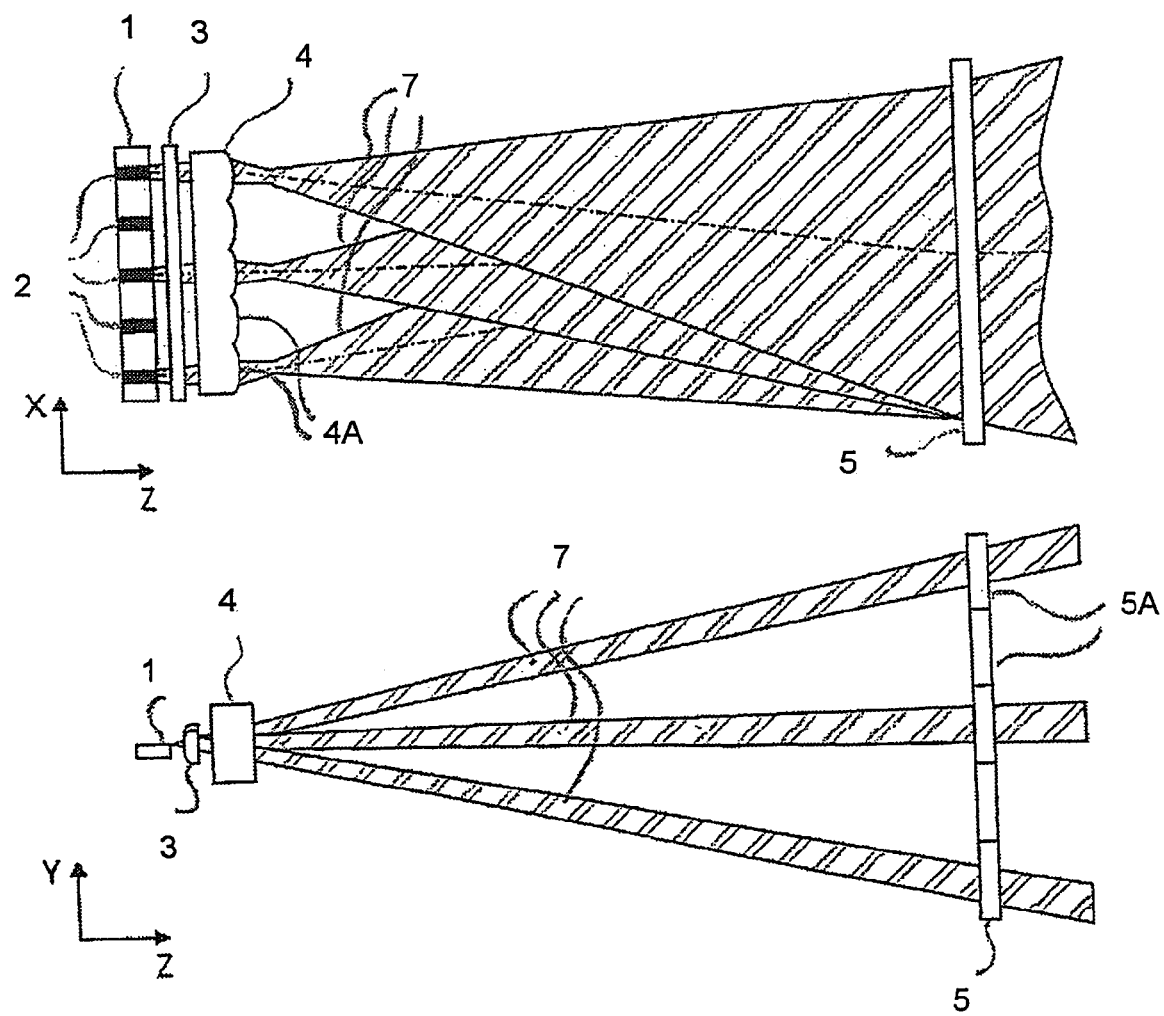
FIG. 1, the progression of the output beam clusters of three linear emitters through optical arrangement in two planes.

In the optical beam shaping arrangement shown in FIG. 1, the reference symbol 1 identifies a high-power laser diode array. The laser diode array 1 comprises a plurality of individual laser diodes or emitters 2 that are arranged adjacent to one another in the x-direction and spaced apart by a fixed distance. In the direction of the adjacent arrangement x-direction), a typical laser diode array 1 has a size of 10 mm, wherein the individual emitters, for example, 16 emitters, are arranged linearly. The size of the emitters in the x-direction varies between approximately 50 μm and 200 μm and is dependent on the specific type of laser diode. The divergence of the output radiation of each individual laser diode is relatively low in the x-z plane illustrated in FIG. 1A, wherein half the aperture angle amounts to approximately 6°. In the direction that extends perpendicular to the x-direction (y-direction), the individual laser diodes have a size of approximately 1 μm, wherein the size is defined by the epitaxy. Accordingly, the divergence of the output radiation is significantly greater in the y-z plane illustrated in FIG. 1B, wherein half the aperture angle amounts to approximately 30°. Regions in which no radiation is emitted are situated between the individual laser diodes or emitters.

The extreme asymmetry of the output radiation caused by the different dimensions in the y-direction and the x-direction is disadvantageous in numerous applications. In order to achieve a symmetric output radiation, the beam clusters of the individual laser diodes need to be modified in such a way that they are arranged linearly in the originally highly divergent direction (y-direction).

A microcylindrical collimator lens 3 is arranged parallel to the laser diode array 1 and tilted about the z-axis that represents the optical axis as shown in FIG. 1B. The microcylindrical lens 3 is realized in such a way that it is sufficiently isoplanasic. The respective output beam clusters 7 of the laser diodes 2 are individually collimated and deflected at different angles relative to the original optical axis (z-axis in FIG. 1) due to the incline of the microcylindrical lens 3. This causes the output beam clusters to be offset in height or separated in the y-direction. The radiation emitted by the individual laser diodes 2 passes through the cylindrical lens in an unchanged fashion in the x-z direction. An aspherical microcylindrical lens or an optically graduated microcylindrical lens with a one-dimensional or even a two-dimensional refractive index profile may be utilized as the microcylindrical collimator lens. It would also be conceivable to utilize a cylindrical Fresnel lens, a plano-convex or biconvex lens including fiber-optic lens (round cross section), as well as a multi-component cylindrical lens system consisting of two or more of the above-described single lenses.

The cylindrical lens array 4 is arranged downstream of the microcylindrical lens 3. According to FIG. 1A, the output beam clusters 7 of the individual laser diodes 2 are deflected in the direction of the linear arrangement of the individual laser diodes 2 in the array 1, i.e., in the x-z plane, such that the principal beams of the beam clusters coincide at a certain distance downstream of the cylindrical lens array 4, i.e., the beam clusters lie on top of one another in the x-direction and are spaced apart by a predetermined distance. The beam clusters are only slightly influenced in the y-z plane. FIG. 1 shows the progression of the beam clusters through the optical arrangement in the x-z plane and the y-z plane on the example of the output beam clusters of three linear emitters 1. The principal beams of the three beam clusters are illustrated in the form of continuous lines in the x-z plane. The cylindrical lens array 4 has a positive refractive power in this case and is spaced apart from the emitters 2 by the focal length.

A deflection element 5 is arranged at the predetermined distance, at which the principal beams of the individual beam clusters coincide as shown in FIG. 1A. This deflection element deflects the beam clusters of the individual laser diodes in such a way that the different incidence angles in the x-z plane caused by the cylindrical lens array 4 are corrected, i.e., the angles of inclination relative to the z-axis or optical axis caused by the cylindrical lens array 4 are compensated. In order to realize these different deflection angles, the deflection element 5 needs to comprise different deflection areas that are arranged linearly, wherein the deflection element may consist, for example, of narrow prismatic bodies. However, the manufacture of such a deflection element 5 is relatively costly. It is easier to realize the deflection element in the form of a screen array with deflecting screens.

Downstream of the deflection element 5, the beam clusters of the individual laser diodes 2 progress in the same direction referred to the x-z plane, i.e., the radiation emitted by the individual laser diodes 2 lie on top of one another as shown in FIG. 1A downstream of the deflection element. Relative to the y-z plane, the individual clusters 7 maintain their divergent directions as shown in FIG. 1B.

According to one preferred embodiment of the invention, a (not-shown) focusing system is arranged upstream or downstream of the deflection element 5, wherein said focusing system may consist, for example, of achromatic lenses; this makes it possible to concentrate the beam clusters 7 of the individual laser diodes 2 very well in a largely symmetric beam spot of small dimensions in the y-z plane and in the x-z plane. This radiation can then be coupled into an (not-shown) optical fiber in a highly efficient fashion.

In such an example, one utilizes a linear optical emitter, the 16 individual emitters of which emit radiation with a wavelength of 800 nm in the y-direction with a divergence of 0.5 rad and with limited diffraction. The size of the individual emitters in the x-direction is 100 µm, with the radiation being emitted with a divergence of 0.1 rad in the x-direction. The distance (pitch) between one emitter and the adjacent emitter is 650 µm, i.e., the linear optical emitter has a size of 10.4 mm in the x-direction. The beam parameter product amounts to 520 µm*rad in the x-direction and 0.25 µm*rad in the y-direction, i.e., the beam quality is much lower in the x-direction than in the y-direction.

A microcylindrical lens 3 that has a focal length of 200 µm in this embodiment is used for collimating the highly divergent emitting direction (y-direction) and for deflecting the individual collimated beam clusters 7 in the y-direction. The outer single emitters 2 are collimated axially outward by approximately 0.14° if the microcylindrical lens is inclined, i.e., turned about the optical axis, namely in such a way that the outermost collimated cluster has an angle of approximately 3.5° referred to the optical axis in the y-direction. The incline of the cylindrical lens corresponds to a virtual offset of the emitters in the y-direction, and the beam parameter product of the entire emitter 1 in the y-direction is now increased to 6 µm*rad.

The single lenses 4A of the cylindrical lens system 4 have a focal length of 1000 µm and are respectively spaced apart from the emitters 2 by the focal length. The distance between the single lenses 4A in the x-direction is 630 µm and consequently smaller than the distance (pitch) of 650 µm between the emitters 2. One single lens 4A is assigned to each emitter. In the arrangement shown that comprises an even number of 16 emitters, the two central emitters are respectively offset relative to the optical axis of the single lenses 4A by 10 µm and the two outermost emitters are respectively offset relative to the optical axis by 150 µm. Downstream of the single lenses 4A, the aperture angle of the beam clusters in the x-direction is approximately 2.9° and the principal beams of all beam clusters overlap on the deflection element 5 in the x-direction in the distance of 32 mm downstream of the cylindrical lens system 4. The individual emitters are separated from one another in the y-direction and are approximately spaced apart from one another by their size. This results in a whole beam cluster with an approximately symmetric size of 3.2×4.0 mm in the plane of the deflection element 5 when utilizing symmetric virtual emitters with a size of approximately 200×200 µm. The different deflection areas 5A of the deflection element 5 now deflect the beam clusters of the individual emitters 2 in the x-z plane in such a way that the inclination angles referred to the z-axis caused by the cylindrical lens system 4 are compensated. This corresponds to a virtual spatial superposition of all emitters in the x-direction, i.e., the beam parameter product of the entire emitter 1 now amounts to 5 µm*rad in the x-direction and 6 µm*rad in the y-direction. These characteristics of the whole beam cluster are advantageous because it is now possible to couple the emitted radiation into an optical fiber by means of a simple focusing system with a small aperture.

If one attempts to achieve the same distance of the deflection element 5 with a field lens, said field lens would have to have a focal length of approximately 32 mm. If all other parameters remain unchanged, one obtains a whole beam cluster with a size of 6.4×3.4 mm in the plane of the deflection element 5 when utilizing asymmetric virtual emitters with a size of 100×200 µm. Such a whole beam cluster is less suitable for being coupled into an optical fiber because this would require a focusing system with a larger aperture and a different enlargement for the x-direction and the y-direction. Symmetric virtual emitters with a size of 100×100 µm are obtained with a microcylindrical lens 3 that has a focal length of 100 µm. When turning the microcylindrical lens 3 about the optical axis by 0.14°, the whole beam cluster incident on the deflection element 5 now has a size of 6.4×8.0 mm. This means that a downstream focusing system needs to have an even larger aperture. A reduction of the turning angle of the microcylindrical lens 3 about the optical axis would cause the separation of the emitters 2 to become inferior again and increase the sensitivity against unevenness (smile) of the entire emitter 1.

In order to achieve a distance of 32 mm from the deflection element 5 with a Fourier lens, said lens needs to have a focal length of 16 mm. Due to the divergence of the beam clusters in the x-direction, the aperture of this lens is at least 14 mm, i.e., the lens is "faster" than f:1.2. If the field has a size of 11 mm, substantial focusing errors due to astigmatism and coma are unavoidable with such a lens. In addition, the segments 5A of the deflection element 5 only are half as large as in the case of cylindrical lens system 4 or a field lens. This complicates the manufacture of the deflection element 5.

In the described example, it is discussed how the cylindrical lens system 4 makes it possible to adapt the characteristics and the size of the whole beam cluster, the size and the symmetry of the virtual emitters and the location and the size of the deflection element 5 to the respective requirements for a given idealized emitter. This makes it possible, in particular, to achieve a very simple downstream focusing in a symmetric spot, a short structural length and a small aperture of downstream lenses. In addition, it is possible to take into account the size of and ability to manufacture the deflection element. The previous explanations apply analogously to systems, in which the focusing qualities of the lenses, the desired efficiency, the evenness of the array (smile) as well as adjusting and installation tolerances are additionally taken into account.

However, the deflection element 5 still needs to correct the different incidence angles of the beam clusters of the individual laser diodes 2 according to FIG. 1A in the x-z plane. This correction can be realized, in principle, in the plane of the deflection element due to the spatial separation of the individual beam clusters in the y-direction according to FIG. 1B. In this case, a different deflection is required for each individual beam cluster. In an embodiment with an even number of 16 emitters, these deflection angles lie between −0.6° for the beam cluster of a central emitter and −9.6° for the beam clusters of marginal emitters. The individual deflecting areas need to have a width of 0.2 mm in the y-direction and approximately 4 mm in the x-direction in accordance with the dimension of the beam clusters in the plane of the deflection element. A classic design with 16 narrow prismatic bodies is utilized in the described embodiment.

The deflection element 5 arranged downstream of the cylindrical lens array 4 consequently deflects each beam cluster in the x-z plane, such that the deflection caused by the cylindrical lens array 4 is compensated. Downstream of the deflecting element 5, the principal beams of the beam clusters coincide with the optical axis in the x-z plane. The whole beam cluster can be coupled, for example, into a (not-shown) optical fiber with adapted core diameter and acceptance angle by means of a (not-shown) focusing system arranged downstream of the deflection element 5.

FIG. 2 shows the progression of the output beam clusters of the three linear emitters according to FIG. 1. FIG. 2A shows the x-z plane and FIG. 2B shows the y-z plane. In FIG. 2, each output beam cluster is composed of the beam clusters of three field points of an emitter 2. This makes it possible to adequately reproduce the transformation of the beam characteristics of the output beam clusters by means of the cylindrical lens array 4 and the cylindrical lens system 3. The cylindrical lens array 4 has a positive refractive power in this case and is spaced apart from the emitters 2 by the focal length.

Figure 3:
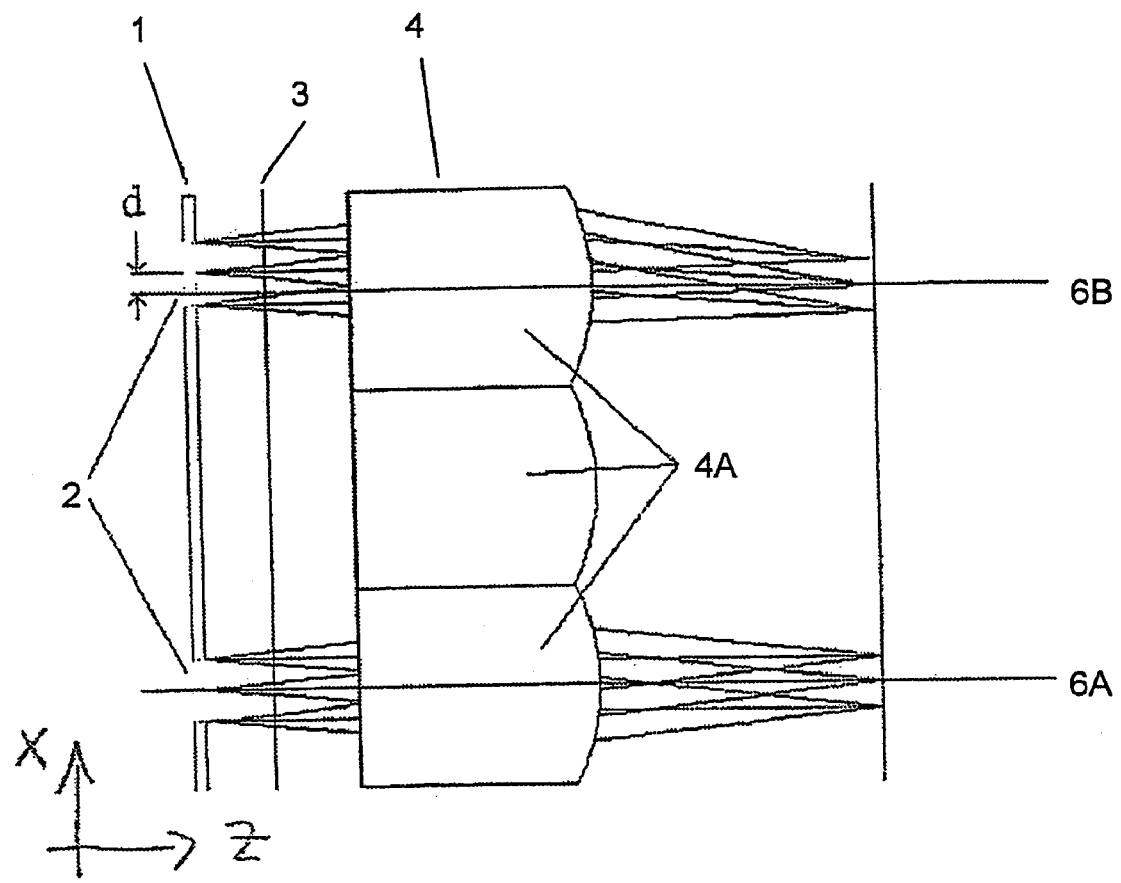
FIG. 3, a detail of FIG. 2.

FIG. 3 shows a detail of FIG. 2. This figure shows, in particular, the different pitches of the laser diode array 1 and of the cylindrical lens array 4, as well as the resulting offset between the emitters 2 and the single lenses 4A that increases in the x-direction: the lower lens of the three single lenses shown represents the central lens of the device or the lens that is arranged on the optical axis (z-axis) referred to the x-direction. The optical axis 6A of this single lens is offset relative to the center of the respectively assigned emitter 2 by d=0. The upper lens of the three single lenses shown has an offset between its optical axis 6B and the center of the respectively assigned emitter 2 that is identified by the reference symbol d. The cylindrical lens array 4 has a positive refractive power in this case and is spaced apart from the emitters 2 by the focal length.

Figure 4:
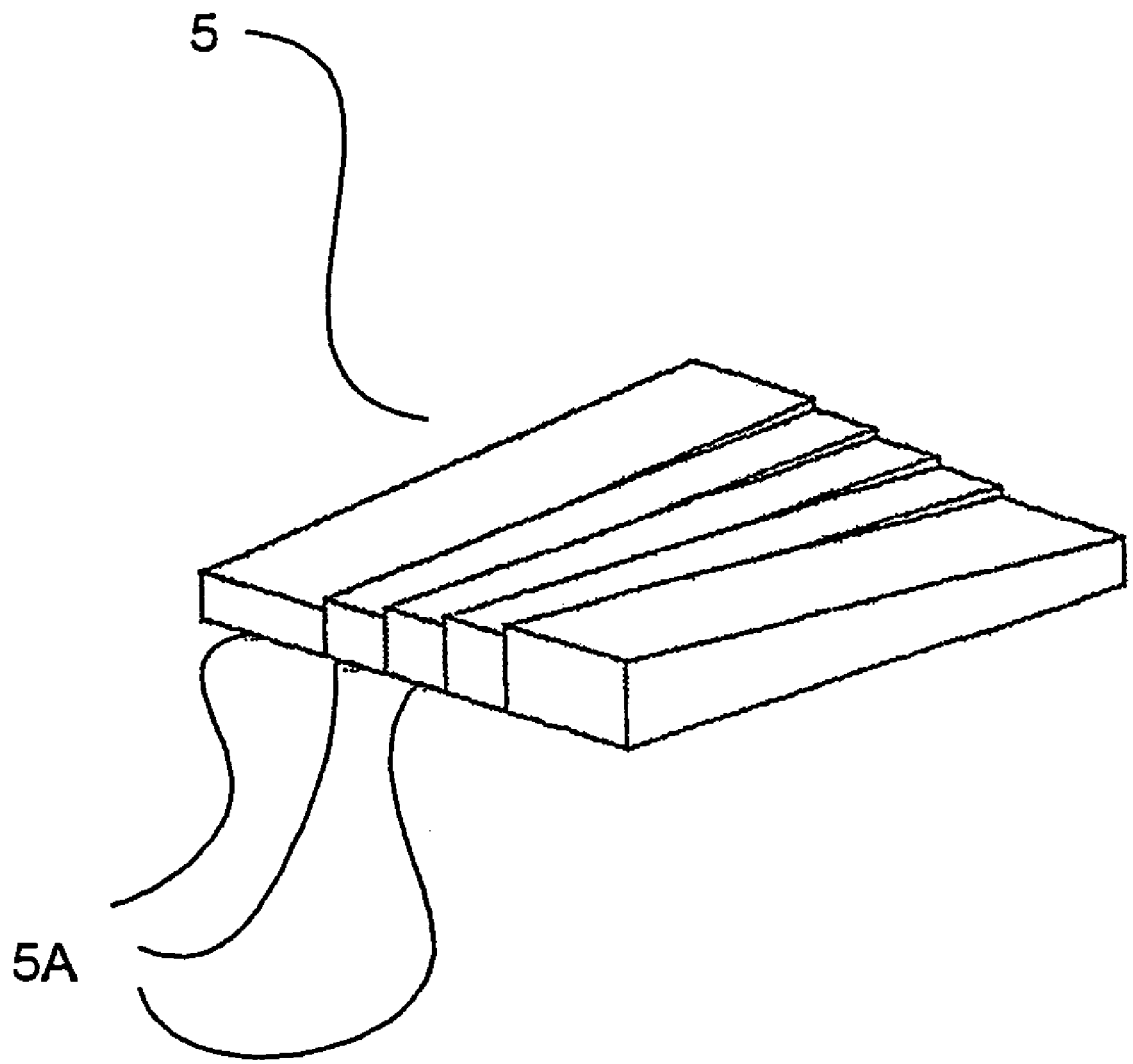
FIG. 4, the schematic design of a deflection element.

FIG. 4 shows the schematic design of a deflection element 5 that is composed of prisms. Although this figure does not show the device according to the invention, it may be used for explaining individual aspects of the device. In the embodiment shown, the deflection element 5 is composed of a field of several prisms 5A.

The invention claimed is:

1. An optical symmetrization device for symmetrizing the radiation emitted by a plurality of linear optical emitters that are arranged adjacent to one another in fixed allocation in a first x-direction, wherein said emitters emit in a common z-direction that extends perpendicular to the x-direction, and wherein the output beam clusters of said emitters have a significantly lower beam quality in the x-direction than in the y-direction that extends perpendicular to the x-direction and to the z-direction, comprising:
    a cylindrical lens system arranged downstream of the optical emitters in the z-direction and that comprises one or more cylindrical lenses that collimate and transform the output beam clusters of the individual emitters in the y-z plane,
    wherein at least one of the cylindrical lenses of the cylindrical lens system is arranged such that it is tilted about the z-axis and/or an optional deflection element is arranged downstream of the cylindrical lens system in the z-direction, such that the output beam clusters of the individual linear optical emitters are respectively deflected in the y-direction by a different angle,
    a first deflection element that is arranged downstream of the cylindrical lens system in the z-direction and respectively deflects the beam clusters of the individual linear optical emitters in the x-direction by a different angle, such tat the principal beams or centroidal beams of the individual beam clusters coincide at a predetermined distance, and
    a second deflection element that is arranged downstream of the first deflection element in the y-direction and spaced apart therefrom by a predetermined distance, wherein the second deflection element deflects the beam clusters of the emitters in such a way that the deflection of the beam clusters caused by the first deflection element is compensated in the x-z plane,
    wherein the first deflection element comprises at least one cylindrical lens array with at least two cylindrical single lenses that are arranged adjacent to one another in the x-direction, wherein two adjacent single lenses are spaced apart by a distance that is smaller than the distance between two adjacent linear optical emitters.

2. The device according to claim 1, wherein at least two cylindrical single lenses of the at least one cylindrical lens array are arranged adjacent to one another perpendicular to the z-direction.

3. The device according to claim 1, wherein at least one of the linear optical emitters comprises or consists of a laser diode.

4. The device according to claim 1, wherein at least one of the laser diodes consists of a spread beam laser diode.

5. The device according to claim 1, wherein the focal length of the cylindrical lens system, the tilting angle of the cylindrical lens system about the z-axis, the focal length of the single lenses of the least one cylindrical lens array and the distance between the cylindrical single lenses of at least one of the cylindrical lens arrays and/or the deflection angles of the optional deflection element for the y-direction are defined in such a way that the whole beam cluster has the same divergence and/or the same size in the x-z plane and in the y-z plane downstream of the second deflection element.

6. The device according to claim 1, wherein the focal lengths of the cylindrical lens system and the single lenses of the at least one cylindrical lens array are defined in such a way that the virtual waist of the beam clusters has approximately the same size in the x-z plane and in the y-z plane.

7. The device according to claim 1, wherein the distance between two adjacent single lenses of at least one of the cylindrical lens arrays and the different deflection angles of the second deflection element are chosen such that the second deflection element is spaced apart from the cylindrical lens array by the shortest distance possible.

8. The device according to claim 1, wherein the cylindrical lens system contains a Fresnel lens, a plano-convex or biconvex lens and/or a combination thereof, and/or that the cylindrical lens system is realized in the form of a refractive optical element with at least one spherical or aspherical surface or in the form of an optically graduated cylindrical system.

9. The device according to claim 1, wherein the optically graduated cylindrical system has a one-dimensional or a two-dimensional refractive index profile.

10. The device according to claim 1, wherein the optional deflection element is inserted into the cylindrical lens system or is arranged directly downstream thereof.

11. The device according to claim 1, wherein the optional deflection element is arranged directly downstream of the at least one cylindrical lens array.

12. The device according to claim 1, wherein the second deflection element contains prisms, flat plates, deflecting screens, optically graduated deflecting areas, mirrors and/or cylindrical lenses.

13. The device according to claim 1, wherein the second deflection element is realized in the form of a field of deflecting screens and/or in the form of a prism field.

14. The device according to claim 1, wherein the deflecting areas or prisms are respectively arranged adjacent to one another in the y-direction with different deflection angles of the deflecting screen field or the prism field.

15. The device according to claim 1, wherein the width of the deflecting areas or the prisms in the y-direction corresponds to the distance between the centroidal beams of the beam clusters in the y-direction or a multiple thereof in the plane of the second deflection element.

16. The device according to claim 1, wherein at least one of the single lenses is realized in the form of a plano-convex or biconvex cylindrical lens with spherical or aspherical surface or in the form of an optically graduated cylindrical system with positive refractive power, or that at least one of the single lenses is realized in the form of a plano-concave or biconcave cylindrical lens with spherical or aspherical surface or in the form of an optically graduated cylindrical system with negative refractive power.

17. The device according to claim 1, wherein the first deflection element comprises or consists of at least two cylindrical lens arrays, in which the single lenses have positive and/or negative refractive power.

18. The device according to claim 1, wherein a collimator system or anamorphotic collimator system is arranged upstream or downstream of the second deflection element in order to minimize the divergence of the whole beam cluster at least in the y-z plane.

19. The device according to claim 1, wherein the second deflection element is arranged downstream of the collimator system and spaced apart therefrom by the shortest distance possible.

20. The device according to claim 1, wherein a focusing system is arranged downstream of the second deflection element and the collimator system.

21. The device according to claim 1, wherein a fiber-optical waveguide is arranged downstream of the focusing system, wherein the whole beam cluster can be coupled into said fiber-optical waveguide.

22. The device according to claim 1, wherein the focal lengths of the focusing system, the collimator system, the cylindrical lens system and the cylindrical lens array, as well as the distance between two adjacent single lenses, are chosen for the coupling into a fiber-optical waveguide in such a way that the entire arrangement has the shortest length possible.

23. The device according to claim 20, wherein the focusing system contains at least one achromatic lens.

24. The utilization of a device according to claim 1 in the fields of material processing, medical engineering, telecommunications engineering, lighting or display engineering, analytics, printing or photography or for pumping lasers.

* * * * *